April 7, 1931.　　　J. MAINLAND　　　1,799,306
COMBINE
Filed July 18 1928　　　7 Sheets-Sheet 1

Fig. 1.

Inventor
John Mainland
by Parker + Carter.
Attorneys.

April 7, 1931. J. MAINLAND 1,799,306
COMBINE
Filed July 18, 1928  7 Sheets-Sheet 3

Inventor
John Mainland
by Parker & Carter
Attorneys.

April 7, 1931.  J. MAINLAND  1,799,306

COMBINE

Filed July 18, 1928  7 Sheets-Sheet 7

Inventor
John Mainland
by Parker & Carter
Attorneys.

Patented Apr. 7, 1931

1,799,306

UNITED STATES PATENT OFFICE

JOHN MAINLAND, OF LA PORTE, INDIANA, ASSIGNOR TO ADVANCE-RUMELY COMPANY, OF LA PORTE, INDIANA, A CORPORATION OF INDIANA

COMBINE

Application filed July 18, 1928. Serial No. 293,626.

This invention relates to grain harvesting machines, and in the form illustrated herewith, is applied particularly to a so-called "combine" in which grain cutting, gathering and threshing mechanisms are mounted together in a single machine. The invention is of course not limited to this particular association. One of the objects of the invention is to provide means within a grain cutting mechanism, by means of which grain may be cut and dropped again on the field from which it has been cut without being run through the separating or other processing mechanism. Another object of the invention is to provide in connection with a combine, means whereby grain may be cut and laid in regularly ordered rows without being otherwise processed or separated. Other objects will appear from time to time in the course of the specification and claims.

The invention is illustrated more or less diagrammatically in the accompanying drawings, wherein.

Like parts are designated by like characters throughout the specification and drawings.

A represents a combine. $A^1$, $A^1$ are supporting wheels. $A^2$ is a steering wheel. $A^3$ is the house upon which part of the conveying mechanism and separating mechanism is positioned. These features will be described later.

B represents generally the cutting mechanism. It is carried on a frame work partially made up of the axle $B^1$ which is fastened to the frame of the combine at $B^2$ and carries a supporting wheel $B^3$ at its outer end. $B^4$, $B^4$ are supporting braces by means of which the cutter B and the conveying mechanism $B^5$ are supported from the axle $B^1$. $B^6$ is a brace fastened at $B^7$ to the axle member $B^1$ and at $B^8$ to the combine frame. $B^9$ represents generally a counter-balancing mechanism fastened at $B^{10}$ to a supporting member $B^{11}$. $B^{12}$ is an adjusting member by means of which the counter-balancing mechanism may be adjusted. These parts are not described in detail as they form no part of the present invention. They merely show diagrammatically a cutting and conveying mechanism which is partially supported from the combine and is provided with an adjustable counter balancing mechanism so that the weight of the cuting and conveying parts is counter-balanced and is adjustable. These features form no essential part of the present invention.

C, C are elevators which take material from the conveyor $B^5$, elevate and convey it into the interior of the house and so bring it onto an intermediate conveyor which conveys the material into the threshing zone.

Figure 1:
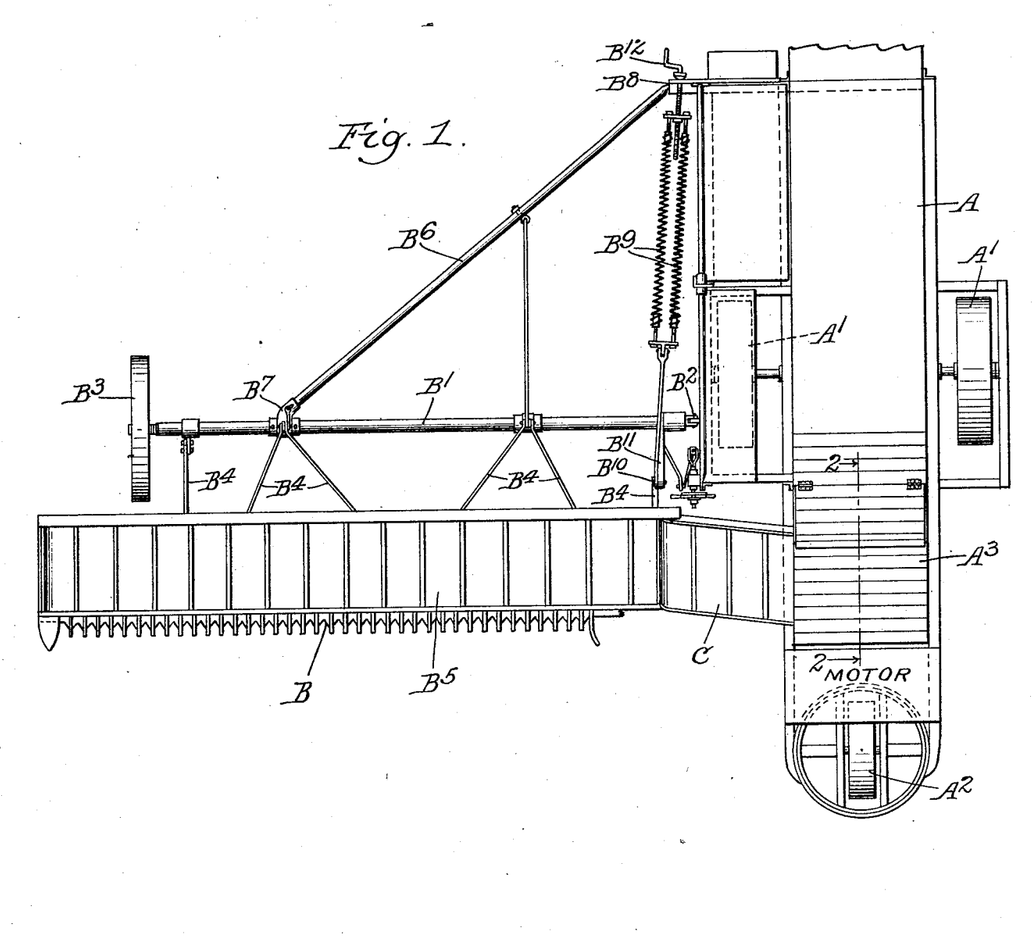
Figure 1 is a plan view of a portion of a separator.
Figure 2:
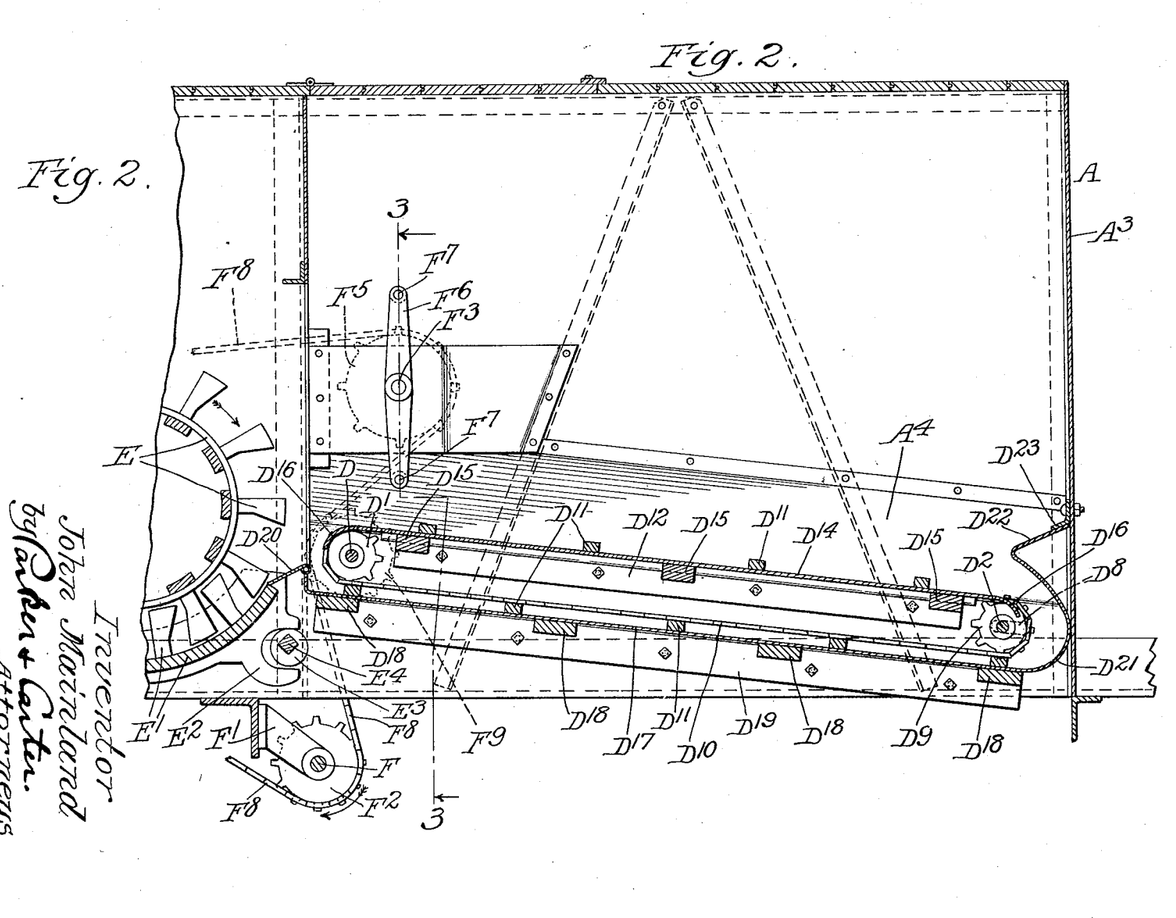
Figure 2 is a vertical longitudinal section on an enlarged scale, taken on line 2—2 of Figure 1.
Figures 3, 4:
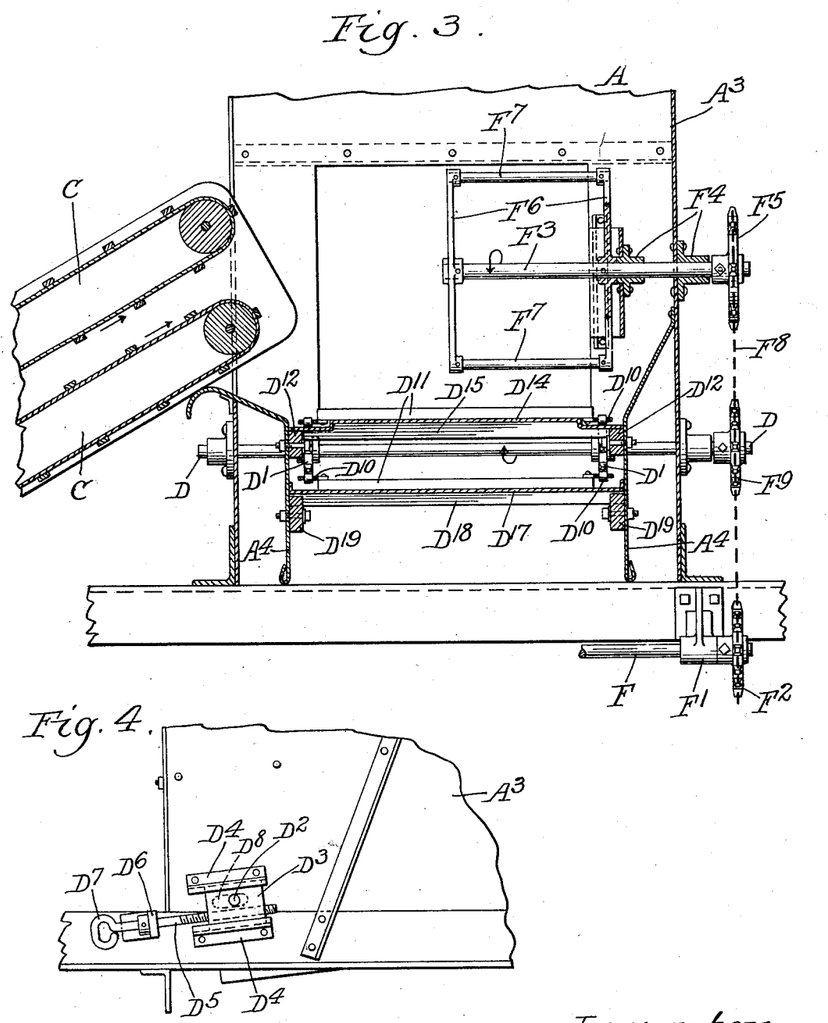
Figure 3 is a fragmentary, vertical transverse section taken on line 3—3 of Figure 2.
Figure 4 is a fragmentary side elevation showing the forward shaft mounting of a portion of the conveying mechanism.
Figure 5:
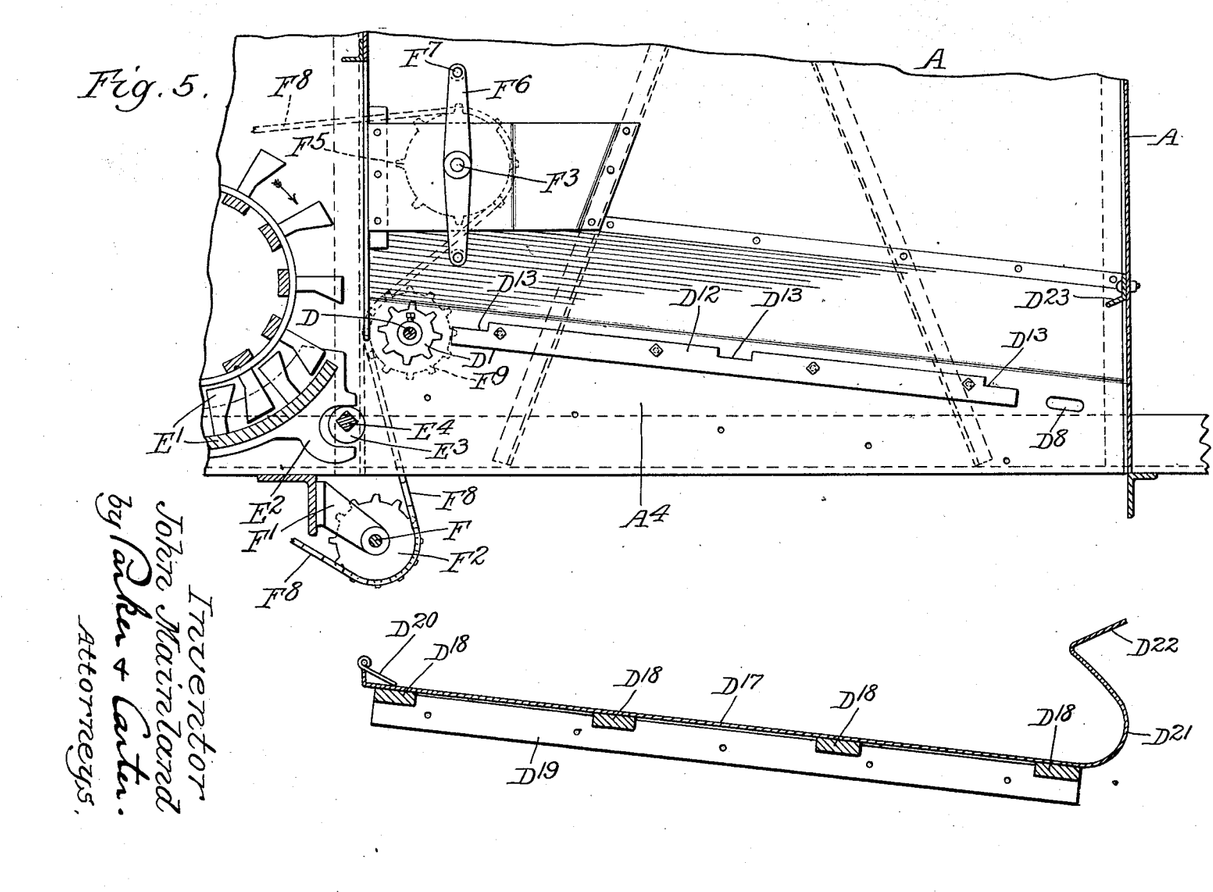
Figure 5 is a view generally similar to Figure 2, with a portion of the conveying mechanism removed.

D is a shaft journaled within the house and carrying sprocket wheels $D^1$, $D^1$. $D^2$ is a shaft journaled in blocks $D^3$ which are slidably mounted between guiding tracks $D^4$ preferably upon the exterior of the house. $D^5$ is an adjusting screw positioned by means of the member $D^6$ and provided with a turning handle $D^7$. By means of the screw the blocks may be moved backwards and forwards to adjust the position of the shaft $D^2$. This shaft extends across the house $A^3$ and passes through slots $D^8$ in its outer walls. $D^9$, $D^9$ are sprocket wheels positioned upon the shaft $D^2$. $D^{10}$ is a flexible conveyor positioned about the sprockets $D^1$, $D^9$ and carrying cleats $D^{11}$. $D^{12}$ is a side supporting member provided with notches $D^{13}$. This member is bolted or otherwise secured to the inside of the inner housing members $A^4$ in the position shown in Figures 2 and 5. Two such members are used, one on opposite sides of the house. A pan $D^{14}$ is removably supported upon the member $D^{12}$. It carries stiffening bars $D^{15}$ which fit into the notches $D^{13}$. It is provided with curved ends $D^{16}$ which extend downwardly partially over the shafts D and $D^2$. $D^{17}$ is a lower pan provided with reinforcing members $D^{18}$ and side supporting members $D^{19}$. It carries a hinged flap $D^{20}$ and is curved at one end as at $D^{21}$ and terminates in a rearwardly bent portion $D^{22}$ which is adapted to fit under a flange $D^{23}$ positioned on the inside of the house, as shown particularly in Figures 2 and 5. The pan $D^{17}$ may be removed by unbolting or otherwise unfastening the side members $D^{19}$.

E is a threshing cylinder. $E^1$ is a threshing concave. It is provided with a jaw $E^2$ within which is positioned an eccentric $E^3$ carried by a shaft $E^4$. The flap $D^{20}$ may be moved to the position shown in Figure 2 and in this position rest upon the upper end of the concave as shown.

F is a shaft carried by a bracket $F^1$ and carrying an idler sprocket $F^2$. $F^3$ is a beater shaft journaled in the bearings $F^4$, $F^4$ carried upon the wall of the house $A^3$. At its outer end the shaft carries a sprocket $F^5$. Within the housing it carries a beater composed of the arms $F^6$ and beating cross members $F^7$. $F^8$ is a driving chain or belt which meshes with the idler $F^2$, the sprocket $F^9$ on the shaft D and the sprocket $F^5$ on the shaft $F^3$.

A modified form of the invention is shown in Figures 6 to 9, inclusive. As shown in these figures, the same general arrangement is provided, but the intermediate conveyor, instead of being entirely removed from the assembly when it is desired to deposit the cut material on the ground, is merely rotated at one end downwardly so that the material which comes upon it may be deposited radially upon the surface of the field on which the machine is moving. Thus it is unnecessary to remove any of the mechanism from the machine. For some purposes this is more desirable than removing the intermediate conveyor, as shown in the first form.

G is a shaft mounted within the casing and carrying a pair of sprocket wheels $G^1$, $G^1$ mounted for rotary adjustment about the shaft G and two side frame members $G^2$, $G^2$. Supported below these side members is a bottom pan $G^3$ which carries a hinged flap $G^4$ similar to the flap $D^{20}$ described above. $G^5$ are stiffening members fastened to the bottom of the member $G^4$. $G^6$ is a fixed member provided with a generally curved portion and with a radially bent straight portion $G^7$. It is adapted to be fastened to the wall of the house $A^3$ at $G^8$ and over-laps one end of the pan $G^3$. $G^9$, $G^9$ are cross members joining the side frame members $G^2$ and supporting the upper pan $G^{10}$ which is provided with downwardly bent or curved edges $G^{11}$. $G^{12}$ is a conveyor chain carrying conveying cleats $G^{13}$. $G^{14}$ is a shaft pivotally mounted in the side members $G^2$ and carrying a pair of sprocket wheels $G^{15}$. The conveyor chains $G^{12}$ mesh with the sprockets $G^{15}$ and $G^1$. $G^{16}$, $G^{16}$ are adjusting bars. A rack $G^{17}$ is cut in the upward portion of each one and their lower ends are curved at $G^{18}$ and pivoted about the shaft $G^{14}$ as shown particularly in Figure 6. $G^{19}$ is a shaft supported in suitable bearings $G^{20}$ on the top of the house $A^3$. $G^{21}$, $G^{21}$ are gears fixed on the shaft $G^{19}$ and each meshing with one of the racks $G^{17}$. $G^{22}$ is a worm gear fixed on the shaft $G^{19}$ and in mesh with a worm $G^{23}$ which is itself fixed on a shaft $G^{24}$ to the opposite end of which is attached a hand wheel $G^{25}$.

Figure 6:
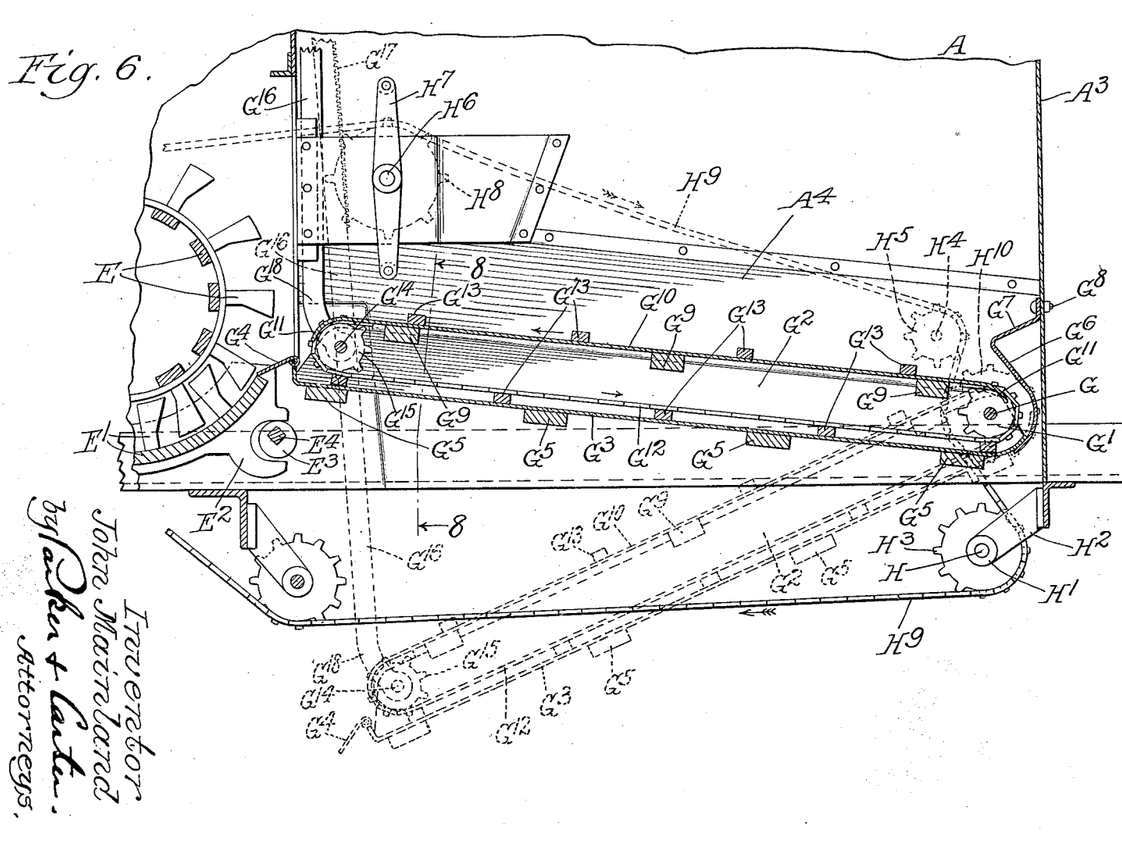
Figure 6 is a view generally similar to Figure 2 showing, however, a modified form.
Figure 7:
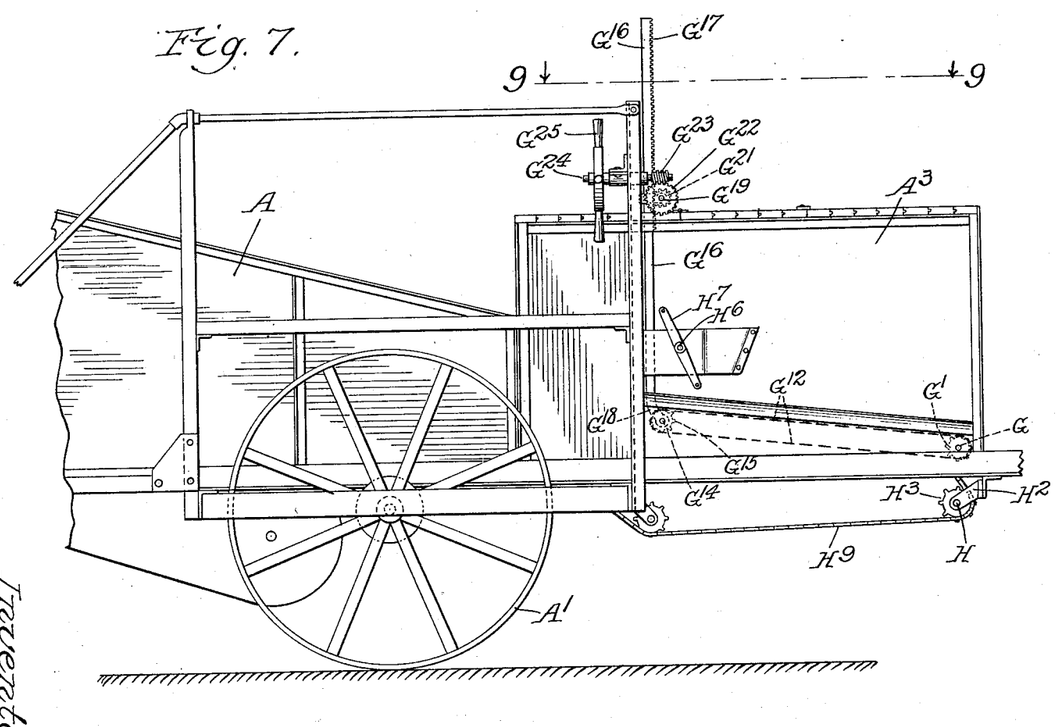
Figure 7 is a side elevation of a combine to which the modified form is applied, with the elevator removed.
Figure 8:
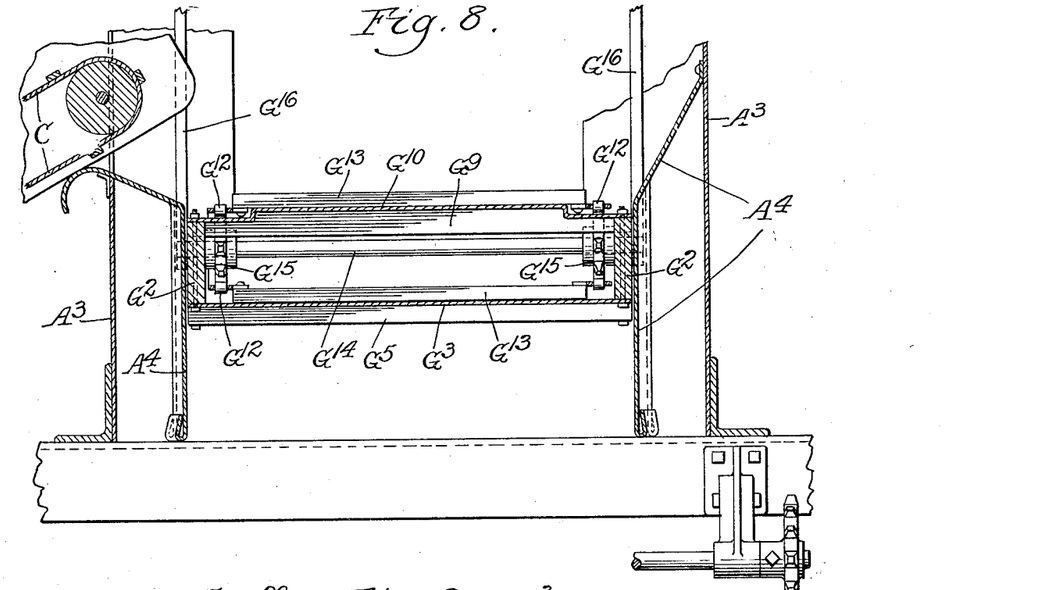
Figure 8 is a transverse, generally vertical cross section taken on line 8—8 of Figure 6.
Figure 9:
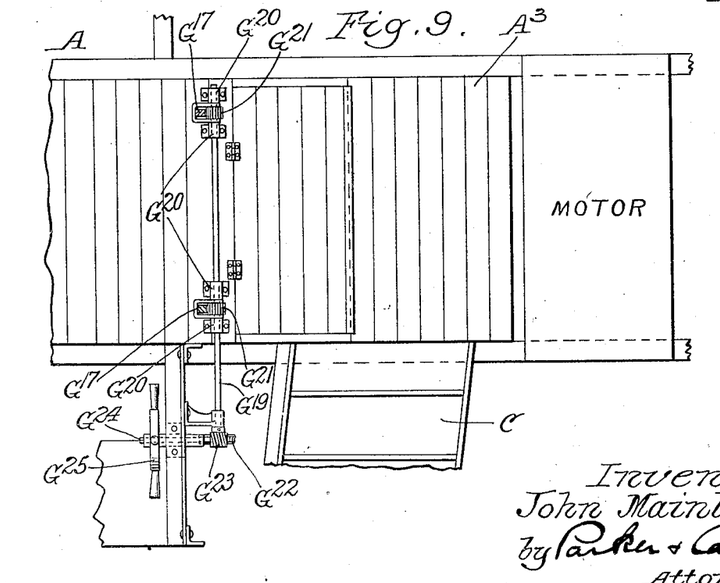
Figure 9 is a horizontal sectional view taken on line 9—9 of Figure 7.

H is a shaft supported in the bearing $H^1$ carried by a bracket $H^2$ which is itself supported on a portion of the frame work of the combine. $H^3$ is a sprocket carried by the shaft H. $H^4$ is a shaft carrying an idler sprocket $H^5$. $H^6$ is a shaft carrying a beater $H^7$ and a sprocket $H^8$. $H^9$ is a belt or chain driven from any suitable portion of the mechanism of the thresher or combine and meshing with the sprockets $H^8$, $H^5$, $H^3$ and a sprocket $H^{10}$ on the outer end of the shaft G which corresponds to the sprocket $F^9$ in the first form. By means of the chain $H^9$ the mechanism of the intermediate conveyor shown particularly in Figures 6 to 8 is driven. Since the pivot point of the intermediate conveyor shown in this modified form is the same as the shaft G, the conveyor is driven by the chain in all positions of adjustment and thus no change or adjusting of the driving means is necessary when the intermediate conveyor is raised or lowered.

It will be obvious that while I have shown an operative device, many changes might be made in the size, shape, number relation and distribution of parts without departing from the spirit of my invention, and I wish, therefore, that my description and showing be considered as in a large measure diagrammatic.

The use and operation of this invention are as follows:

In general practice, when the machine of this invention is to be used, is driven or drawn over the ground, grain is cut, the conveyor in rear of the mowing mechanism moves the grain to the elevator which raises it and discharges it within the house upon the intermediate conveyor. This conveyor moves the grain rearward into the threshing and beating zone. Sometimes it is desirable to cut the grain and not to move it into the threshing zone. To accomplish this purpose I have provided two forms of my invention. In each case a short, rearward, intermediate conveyor is used. In the first form of the invention illustrated in Figures 1 to 5 inclusive I show means for removing this conveyor and thus the material is discharged into the house from the elevator. It merely falls directly through the bottom of the house onto the surface of the ground below. In the second form of the invention shown in Figures 6 to 9 inclusive, the intermediate conveyor is of a modified form and is not removed. It is movable and is pivoted at its forward end, and its rear end may be swung downwardly. Thus it provides a gap in the bottom of the machine and through it material which falls upon this intermediate conveyor is conveyed rearwardly. But instead of being fed into the threshing and separating zone, it is deposited on the surface of the ground.

I claim:

1. In combination in a combine having grain cutting and grain threshing means, a conveyor adapted to move the grain from the cutting means toward the threshing means and means intermediate said conveyor and said threshing means for re-depositing the grain upon the ground, said means including an adjustably mounted rearward conveyor adapted in one position to feed material to the threshing mechanism and in another position of adjustment to deposit it upon the ground.

2. In combination in a combine having grain cutting and grain threshing means, a conveyor adapted to move the grain from the cutting means toward the threshing means and means intermediate said conveyor and said threshing means for re-depositing the grain upon the ground, said means including an adjustably mounted rearward conveyor adapted in one position to feed material to the threshing mechanism and in another position of adjustment to deposit it upon the ground.

3. In combination in a combine having grain cutting and grain threshing means, a conveyor adapted to move the grain from the cutting means toward the threshing means and means intermediate said conveyor and said threshing means for re-depositing the grain upon the ground, said means including an adjustably mounted rearward conveyor adapted in one position to feed material to the threshing mechanism and in another position of adjustment to deposit it upon the ground, said means including an adjustably mounted, rearwardly operating conveyor adapted in one position of adjustment to feed material to the threshing mechanism.

4. In combination in a combine having grain cutting and grain threshing means, a conveyor adapted to move the grain from the cutting means toward the threshing means and means intermediate said conveyor and said threshing means for re-depositing the grain upon the ground, said means including an adjustably mounted rearward conveyor adapted in one position of adjustment to feed material to the threshing mechanism and in another position of adjustment to deposit it upon the ground.

5. In combination in a combine having grain cutting and grain threshing means, a conveyor adapted to move the grain from the cutting means toward the threshing means, said combine formed with an opening in its bottom and means normally situated within said opening and lying intermediate said conveyor and said threshing means, and filling said opening.

6. In combination, in a combine having grain cutting and grain threshing means, a conveyor adapted to move the grain from the cutting means toward the threshing means, said combine formed with an opening in its bottom and means normally situated within said opening and lying intermediate said conveyor and said threshing means, and filling said opening, said means adapted to be so positioned as to permit material to pass through the opening in the bottom of the combine to be deposited on the ground.

7. In combination in a combine having grain cutting and grain threshing means, a conveyor adapted to move the grain from the cutting means toward the threshing means, said combine formed with an opening in its bottom and means normally situated within said opening and lying intermediate said conveyor and said threshing means, and filling said opening, said means including an intermediate conveyor adapted to be so positioned as to convey material to the threshing mechanism and also adapted to be so positioned as to permit material to pass through the opening in the bottom of the combine to be deposited upon the ground.

8. In combination in a combine having grain cutting and grain threshing means, a conveyor adapted to move the grain from the cutting means toward the threshing means, said combine formed with an opening in its bottom and means normally situated within said opening and lying intermediate said conveyor and said threshing means, and filling said opening, said means including an intermediate conveyor adapted to be so positioned as to convey material to the threshing mechanism and also adapted to be so positioned as to permit material to pass through the opening in the bottom of the combine to be deposited upon the ground in a path of less width than that from which the grain was originally cut.

9. In a combine, a conveyor adapted to move grain, and comprising means for re-depositing the grain upon the ground, said means including an adjustably mounted rearward conveyor element adapted in one position of adjustment to feed material along within the combine and in another position of adjustment to deposit it upon the ground.

10. In a grain handling machine, arranged for movement along the ground, a conveying element adjustably mounted, said element including a conveyor adapted to move grain within the machine and adapted in one position to feed the grain along within the machine and in another position of adjustment to redeposit it upon the ground.

Signed at La Porte, county of La Porte and State of Indiana, this 14th day of July, 1928.

JOHN MAINLAND.